Figure 1:
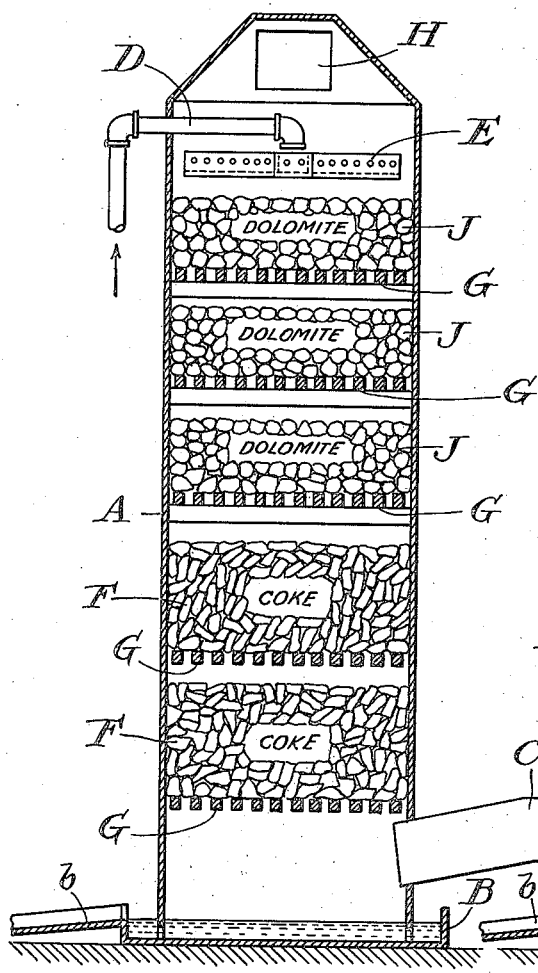

F. A. EUSTIS.
METHOD OF REMOVING SULFUR DIOXID FROM METALLURGICAL SMOKE AND SIMILAR GASES.
APPLICATION FILED MAY 14, 1915.

1,212,199. Patented Jan. 16, 1917.

Inventor:
Frederic Augustus Eustis
by Roberts, Roberts & Cushman
Attorneys.

UNITED STATES PATENT OFFICE.

FREDERIC AUGUSTUS EUSTIS, OF MILTON, MASSACHUSETTS.

METHOD OF REMOVING SULFUR DIOXID FROM METALLURGICAL SMOKE AND SIMILAR GASES.

1,212,199.                Specification of Letters Patent.      Patented Jan. 16, 1917.

Application filed May 14, 1915.    Serial No. 28,186.

*To all whom it may concern:*

Be it known that I, FREDERIC AUGUSTUS EUSTIS, a citizen of the United States, and resident of Milton, in the county of Norfolk and State of Massachusetts, have invented new and useful Improvements in Methods of Removing Sulfur Dioxid from Metallurgical Smoke and Similar Gases, of which the following is a specification.

This invention relates to a method of washing metallurgical smoke for the purpose of taking from it sulfur dioxid. Metallurgical smoke consists of the products of combustion, including $CO_2$, $CO$ to a limited extent, $SO_2$ and $SO_3$, with which are mixed physical dirt or dust, and volatilized substances such as arsenic, antimony and bismuth, sulfur, etc., all diluted with the nitrogen from the air, and probably containing some remaining oxygen from the air. In some localities, it is desirable to remove from the smelter smoke before it is discharged, the sulfur dioxid ($SO_2$) and sulfuric acid gas ($SO_3$); and also the volatilized metals or other substances, and any liquids and solids, or dirt which may be present.

The objects of this invention are: to wash out the sulfur dioxid, and incidentally the physical dirt, $SO_3$, volatilized substances, liquids and solids. It will be understood that the process herein described is in the main addressed to the removal of $SO_2$, but that it will also remove $SO_3$, volatilized substances, and solids and liquids at the same time; and throughout this specification and the claims the removal of these other incidental substances along with the $SO_2$ is contemplated, and is to be understood without special mention. I have found that this washing can be done by the use of copious quantities of water and a base such as $CaO$ and $MgO$ which increases the ability of the water to absorb $SO_2$. The use of a large amount of the soluble basic material, while effective for absorbing the $SO_2$ from the gases, is excessively costly, but with the use of my improved method it is possible to wash out the $SO_2$ by water with any desired amount of the base, thus making the washing commercially practicable under varying conditions of different localities with respect to the relative supply of water, and of lime, magnesia or other base.

The result of my washing is a liquor containing sulfur, and also containing lime or magnesia if the same have been used. The amount of lime or magnesia left in the liquor will obviously vary with the amount used.

The soluble basic material, when used, will preferably consist of limestone or calcite, from which lime is dissolved by the water, or dolomite, which is a limestone containing magnesia, from which lime and magnesia are dissolved by the water. There are also certain salts, such as potassium iodid, potassium bromid, ammonium salts, etc., and certain organic compounds such as camphor, acetic acid, formic acid, acetone, alcohol, etc., which if introduced into the water, increase its ability to absorb $SO_2$ in a marked degree. On account of cost of these materials, it would be advantageous to separate these materials from the used liquor or absorbed gases, and use them over again in a fresh solution which may be cooled to the necessary temperature for washing.

The essential conditions to be observed, are that there must be an abundance of water carrying some ingredient which promotes absorption of the $SO_2$, sufficient to absorb all of the $SO_2$ in the gas within the limitations of the time and space which are feasible in a commercially practicable tower; the liquor must be finely divided so as to present the maximum of absorbing surface, and this can best be effected by breaking the liquor up into a large number of thin and superficially extensive films; and the descent of the liquor thus finely divided must be sufficiently slow to enable the absorption to take place while liquor is passing down through the tower.

As the object of the process is to wash out the sulfur dioxid rather than to obtain a strong liquor, the greater the volume of liquor the better. But as the maximum volume of water possible to use in a given apparatus of practicable dimension is necessarily limited, the other two elements, to wit, the extensive absorbing surface, and the time element, are of prime importance.

In order to divide the liquor into a great number of superficially extensive films, which results in the largest possible exposed area for a given quantity of water, and at the same time to retard the flow of water so as to achieve the necessary time element, I prefer to use in a suitable tower a packing mass of coke, or other suitable insoluble material through which the liquor admitted at the top of the tower trickles slowly down in the form of thin layers. The liquor thus descending through the rising gas takes out the sulfur dioxid, and the gas which passes out from the top of the tower is substantially free from $SO_2$, $SO_3$, the volatilized substances, and liquids and solids, while the liquor, owing to its large volume, contains a weak solution of sulfur dioxid.

The absorptive properties of the liquor may be increased and consequently the volume of water required, may be reduced, by using greater quantities of limestone or dolomite or some similar soluble basic material, through which the water first passes at the top of the tower. By varying the relative quantities of water and lime rock, the capacity of the liquor to absorb $SO_2$, may be maintained, thus making it possible to adapt the process to local conditions according to whether it is more economical to pump great quantities of water and use a small amount of limestone, or to use less water and power with more limestone.

Figure 2:
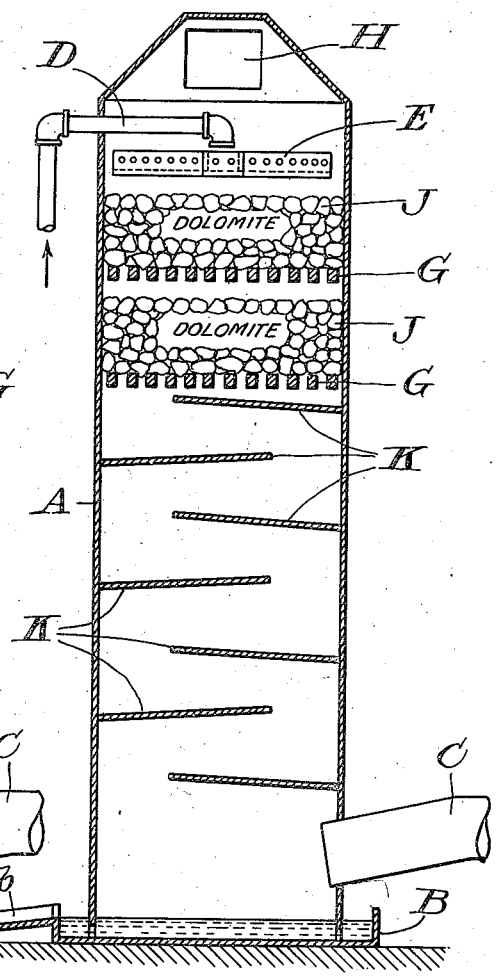

Referring more specifically to the apparatus shown in drawings, Figures 1 and 2 are sectional views of apparatus designed to carry out our invention.

Referring first to Fig. 1, A represents a tower extending downward into a reservoir B in which a water seal is formed. The reservoir B has an overflow outlet b. A gas or smoke inlet pipe C enters the tower at the bottom, and a water supply pipe D enters the top of the tower. A perforated distributing pan E receives the water from pipe D and discharges it into the tower in a spray or shower uniformly distributed across the tower. A series of openwork gratings G, spaced at intervals, are secured in the tower, and support masses or packings F of coke or other suitable broken insoluble material, and like masses J of limestone, dolomite, or like soluble material through the interstices of which the gas can rise and the water descend. If a solid mass or column was used instead of a series of smaller masses at different elevations, this would usually cause the lower part of the mass to be crushed by the weight above it, thereby obstructing the free flow of the gas and water in opposite directions. It is therefore desirable to use only such quantities in any given unit of the packing as can be safely done without danger of closing or obstructing the interstices between the individual pieces.

The gas entering through pipe C is forced by any suitable means to rise through the tower and through the successive layers of packing F and J while the water, descending by gravity from the distributing pan E, is broken up and formed into a great number of thin films as it passes through the packing, thus presenting the maximum surface area as it passes through the rising gas. The trickling of water through the interstices of the packing also retards its flow, thus affording the time necessary for the absorption of the sulfur dioxid during its descent to the bottom of the tower.

The water trickling through the dolomite takes into solution a certain amount of lime and magnesia, the presence of which increases the ability of the liquor to absorb $SO_2$. The water with its lime and magnesia, then trickle through the layers of coke to the bottom of the tower.

In the modification shown in Fig. 2, the tower A, gas intake C, water supply D, gas outlet H, and water seal, may be as before, and one or more layers J of dolomite or the like supported on gratings G at the top of the tower may be used as in the tower shown in Fig. 1.

Instead of the packing of coke at the bottom of the tower, as in Fig. 1, for breaking up the liquor and increasing its exposed surface, a series of shelves K are secured within the tower, extending alternately from opposite walls in staggered relation as shown. These shelves K incline downwardly a little from their free edges toward the walls of the tower so as to form shallow receptacles for holding thin layers of the liquor of relatively large surface exposure. This liquor flows over the edges of the shelves in thin sheets, and the effect is to break up the water into the form of superficially extensive thin films of water, the progress thereof being retarded by passing from shelf to shelf, thus obtaining the same result in a measurable degree, though perhaps less effectively, which is obtained by the use of masses of coke.

I claim:

1. The method herein described of removing sulfur dioxid from metallurgical smoke and similar gases which contain small amounts of sulfur dioxid, said method consisting in passing through a flowing body of said gases a copious flow of water containing, in solution, a material adapted to promote absorption of sulfur dioxid, said water being sufficient in quantity as compared to the volume of gas, to cause with the aid of the absorbent a physical solution of the sulfur dioxid gas in the liquid.

2. The method herein described of removing sulfur dioxid from metallurgical smoke and similar gases which contain small amounts of sulfur dioxid, said method consisting in passing through a flowing body of said gases a copious flow of water in contact with a soluble material of such character that the resulting solution tends to promote absorption of sulfur dioxid, said water being sufficient in quantity as compared to the volume of gas, to cause with the aid of the absorbent a physical solution of the sulfur dioxid gas in the liquid.

3. The method herein described of removing sulfur dioxid from metallurgical smoke and similar gases which contain small amounts of sulfur dioxid, said method consisting in passing through a flowing body of said gases a copious flow of water in contact with successive and separated bodies of soluble material of such character that the solution thereby produced tends to promote absorption of sulfur dioxid, said water being sufficient in quantity as compared to the volume of gas, to cause with the aid of the absorbent a physical solution of the sulfur dioxid gas in the liquid.

4. The method herein described of removing sulfur dioxid from metallurgical smoke or similar gases which contain small amounts of sulfur dioxid, said method consisting in passing through a flowing body of said gases a copious flow of water, said flow passing first through a permeable body of soluble material of such character that the solution thereby produced tends to promote absorption of sulfur dioxid, and then through a permeable body of insoluble material, said water being sufficient in quantity as compared to the volume of gas, to cause with the aid of the absorbent a physical solution of the sulfur dioxid gas in the liquid.

5. The method herein described of removing sulfur dioxid from metallurgical smoke and similar gases which contain small amounts of sulfur dioxid, said method comprising passing through a flowing body of said gases a copious flow of water, said water being sufficient in quantity as compared to the volume of gas to cause with the aid of the absorbent a physical solution of the sulfur dioxid gas in the liquid, said flow of water passing in the presence of the gas first through a permeable body of soluble material, the solution of which tends to promote absorption of sulfur dioxid, and then through means to retard the flow and break up the water so as to present superficially extensive exposed surfaces in contact with the passing of gas.

Signed by me at Boston, Massachusetts, this 12th day of May, 1915.

FREDERIC AUGUSTUS EUSTIS.

Witnesses:
 ROBERT CUSHMAN,
 CHARLES D. WOODBERRY.